United States Patent
Zhou et al.

(10) Patent No.: US 12,432,691 B2
(45) Date of Patent: Sep. 30, 2025

(54) COMMUNICATION METHOD AND APPARATUS

(71) Applicant: Spreadtrum Communications (Shanghai) Co., Ltd., Shanghai (CN)

(72) Inventors: Huayu Zhou, Shanghai (CN); Zhengang Pan, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 339 days.

(21) Appl. No.: 17/791,477

(22) PCT Filed: Feb. 7, 2021

(86) PCT No.: PCT/CN2021/075727
§ 371 (c)(1),
(2) Date: Jul. 7, 2022

(87) PCT Pub. No.: WO2021/139829
PCT Pub. Date: Jul. 15, 2021

(65) Prior Publication Data
US 2023/0039509 A1 Feb. 9, 2023

(30) Foreign Application Priority Data
Jan. 7, 2020 (CN) .......................... 202010013264.6

(51) Int. Cl.
*H04W 68/02* (2009.01)
*H04W 72/1263* (2023.01)
*H04W 72/23* (2023.01)

(52) U.S. Cl.
CPC ....... *H04W 68/02* (2013.01); *H04W 72/1263* (2013.01); *H04W 72/23* (2023.01)

(58) Field of Classification Search
CPC . H04W 68/02; H04W 72/1263; H04W 72/23; H04W 68/025; H04W 52/0229;
(Continued)

(56) References Cited

U.S. PATENT DOCUMENTS

| 2016/0338006 | A1* | 11/2016 | Lee | ................... H04W 52/0229 |
| 2019/0254110 | A1 | 8/2019 | He et al. | |
| 2021/0185652 | A1* | 6/2021 | Rune | ................. H04W 72/0446 |

FOREIGN PATENT DOCUMENTS

| CN | 102833734 A | 12/2012 |
| CN | 108012312 A | 5/2018 |

(Continued)

OTHER PUBLICATIONS

International Search Report and Written Opinion of the International Searching Authority for PCT/CN2021/075727 for PCT/CN2021/075727 dated Apr. 26, 2021, English machine translation also attached.
(Continued)

*Primary Examiner* — Huy C Ho
(74) *Attorney, Agent, or Firm* — MASCHOFF BRENNAN; Paul G. Johnson (57) ABSTRACT

Embodiments of the present disclosure provide a communication method and apparatus applied to a user equipment, where the method includes: monitoring a paging indication physical downlink control channel PDCCH; acquiring paging indication information if the paging indication PDCCH is detected; and determining, according to the paging indication information, whether to monitor a paging PDCCH.

9 Claims, 3 Drawing Sheets

Monitoring a paging indication physical downlink control PDCCH — S201

If the paging indication PDCCH is detected, acquiring paging indication information — S202

Determining, according to the paging indication information, whether there is a need to monitor a paging PDCCH — S203

(58) Field of Classification Search
CPC . H04W 52/0216; H04W 68/00; H04W 24/08; H04W 52/0225; H04L 5/0048; Y02D 30/70
USPC ........................................................ 455/458
See application file for complete search history.

(56) References Cited

FOREIGN PATENT DOCUMENTS

| | | | |
|---|---|---|---|
| CN | 108353382 | A | 7/2018 |
| CN | 109151849 | A | 1/2019 |
| CN | 109286966 | A | 1/2019 |
| CN | 109309555 | A | 2/2019 |
| CN | 109600832 | A | 4/2019 |
| CN | 109792710 | A | 5/2019 |
| CN | 109803355 | A | 5/2019 |
| CN | 109936868 | A | 6/2019 |
| CN | 110536379 | A | 12/2019 |
| CN | 111200870 | A | 5/2020 |
| EP | 3949575 | A1 | 2/2022 |
| EP | 4062691 | A1 | 9/2022 |
| KR | 20190124251 | A | 11/2019 |
| WO | 2020200252 | A1 | 10/2020 |
| WO | 2021104520 | A1 | 6/2021 |

OTHER PUBLICATIONS

Office Action in corresponding Chinese application, 202010013264.6 English machine translation also attached.
First search report in corresponding Chinese application, 202010013264.6 English machine translation also attached.
The Office Action issued by the Japanese Patent Office for the Japanese Patent Application No. 2022-542264 mailed on May 29, 2023.
NTT Docomo, Inc. Discussion on paging enhancements, 3GPP TSG RAN WGI #103-e, R1-2009187, e-Meeting, Oct. 26-Nov. 13, 2020.
Oppo, Potential paging enhancements, 3GPP TSG RAN WG1 #104-e, R1-2100168, e-Meeting, Jan. 25-Feb. 5, 2021.
Vivo, Discussion on paging grouping, 3GPP TSG RAN WG1 #104-e, R1-2100454, e-Meeting. Jan. 25-Feb. 5, 2021.
LG Electronics, Discussion on potential paging enhancements, 3GPP TSG RAN WG1 #104-e, R1-2100903, e-Meeting, Jan. 25-Feb. 5, 2021.
Qualcomm Incorporated, TRS/CSI-RS for idle/inactive UE power saving, 3GPP TSG RAN WG1 #104-e, R1-2101475, e-Meeting, Jan. 25-Feb. 5, 2021.
InterDigital, Inc., Paging enhancements for UE power saving, 3GPP TSG RAN WG1 #104-e, R1-2101787, e-Meeting, Jan. 25-Feb. 5, 2021.
Asia Pacific Telecom, FGI, Paging enhancements for Power Saving, 3GPP TSG-RAN WG2 Meeting #113 electronic, R2-2101841, Online, Jan. 25-Feb. 5, 2021.
The Extended European Search Report for EP 21738760.4 dated Oct. 5, 2023.
The Second Office Action issued by the China National Intellectual Property Administration (CNIPA) dated Aug. 17, 2022 for the Chinese Patent Application No. 202010013264.6.
Korean Request for the Submission of an Opinio, as issued in connection with Korean Application No. 10-2022-7027326, dated Aug. 21, 2025, 16 pgs.
Huawe, HiSilicon, R1-1903192, UE power saving for pginf, 3GPP TSG RAN WG1 #96, 3GPP publicatation date (Mar. 29, 2019).
Vivo, R2-1902285, paying enhancement for power saving, 3GPP TSG RAN WG1 #105, 3PP publication date (Feb. 22, 2019).

* cited by examiner

COMMUNICATION METHOD AND APPARATUS

CROSS-REFERENCE TO RELATED APPLICATIONS

This application is a national stage of International Application No. PCT/CN2021/075727, filed on Feb. 7, 2021, which claims priority to Chinese Patent Application No. 2020100132646, filed on Jan. 7, 2020, both of which are hereby incorporated by reference in their entireties.

TECHNICAL FIELD

Embodiments of the present disclosure relate to the field of computers and, in particular, to a communication method and apparatus.

BACKGROUND

At present, when a user equipment (UE, also known as a terminal) is in an idle state (RRC IDLE, RRC IDLE state, Idle state, Idle mode), in order to receive a paging message sent by a base station, the UE needs to monitor, on a paging occasion (PO), a paging physical downlink control channel (PDCCH) send by the base station using beam sweeping. In a 5G system, the paging PDCCH may be a PDCCH configured by a Type2-PDCCH common search space set (Type2-PDCCH CSS set). Generally, the Type2-PDCCH CSS set is configured by a higher-layer parameter, such as a paging Search Space, and CRC scrambling is performed by a P-RNTI.

In the prior art, since a paging occasion is aimed at a group of UEs, when a paging message carried by a physical downlink shared channel (PDSCH) within the paging occasion is not aimed at a certain UE, if this UE still performs the whole process of monitoring a paging PDCCH and receiving a paging message, but with no paging message that the UE needs (generally this situation is called a false alarm or a false alert), then this UE wastes power on unwanted reception, resulting in a relatively large power consumption for the UE.

In addition, in the 5G system, the UE needs to monitor, on the paging occasion, a paging PDCCH sent by a base station using beam sweeping (including multiple beams) to the UE. According to a detection or a measurement on the beam, the UE selects to monitor the paging PDCCH on one or more beams. When the UE selects to monitor the paging PDCCH on multiple beams, this further leads to a relatively large power consumption for the UE.

SUMMARY

In a first aspect, an embodiment of the present disclosure provides a communication method, which is applied to a user equipment and includes:
monitoring a paging indication PDCCH;
if the paging indication PDCCH is detected, acquiring paging indication information; and
determining, according to the paging indication information, whether to monitor a paging PDCCH.

In a second aspect, an embodiment of the present disclosure provides a communication method which is applied to a user equipment and includes:
monitoring a paging PDCCH;
if the paging PDCCH is detected, acquiring paging indication information;
determining, according to the paging indication information, whether to receive a paging message scheduled by the paging PDCCH.

In a third aspect, an embodiment of the present disclosure provides a communication apparatus, which is applied to a user equipment and includes: a monitoring module, an acquiring module, and a determining module, where:
the monitoring module is configured to monitor a paging indication physical downlink control channel PDCCH;
the acquiring module is configured to acquire paging indication information if the paging indication PDCCH is detected; and
the determining module is configured to determine, according to the paging indication information, whether to monitor a paging PDCCH.

In a fourth aspect, an embodiment of the present disclosure provides a communication apparatus, which is applied to a user equipment and includes: a monitoring module, an acquiring module, and a determining module, where:
the monitoring module is configured to monitor a paging physical downlink control channel PDCCH;
the acquiring module is configured to acquire paging indication information if the paging PDCCH is detected;
the determining module is configured to determine, according to the paging indication information, whether to receive a paging message scheduled by the paging PDCCH.

In a fifth aspect, an embodiment of the present disclosure provides a communication apparatus, including: a processor and a memory;
where the memory stores a computer-executable instruction;
the processor performs the computer-executable instruction stored in the memory, so that the processor performs the communication method described above in any item of the first aspect.

In a sixth aspect, an embodiment of the present disclosure provides a communication apparatus, including: a processor and a memory;
where the memory stores a computer-executable instruction;
the processor performs the computer-executable instruction stored in the memory, so that the processor performs the communication method described above in any item of the second aspect.

In a seventh aspect, an embodiment of the present disclosure provides a computer-readable storage medium having stored therein a computer-executable instruction, where when a processor performs the computer-executable instruction, the communication method described above in any item of the first aspect is implemented.

BRIEF DESCRIPTION OF DRAWINGS

In order to more clearly explain the embodiments of the present disclosure or the technical solutions in the prior art, the following will briefly introduce the accompanying drawings used in the description of the embodiments or the prior art. Apparently, the accompanying drawings in the following description are intended for some embodiments of the present disclosure, and for those of ordinary skill in the art, other drawings can also be obtained from these drawings without any creative effort.

DESCRIPTION OF EMBODIMENTS

In order to describe the objectives, technical solutions and advantages of the embodiments of the present disclosure more clearly, the technical solutions in the embodiments of the present disclosure will be described clearly and comprehensively below with reference to the drawings in the embodiments of the present disclosure. Apparently, the described embodiments are a part but not all of the embodiments of the present disclosure. Based on the embodiments in the present disclosure, all other embodiments obtained by those of ordinary skill in the art without creative efforts shall fall within the protection scope of the present disclosure.

The technical solutions shown in the present disclosure can be applied to the 5th generation mobile communication technology (5G) system, or a long term evolution (LTE) system, or a universal mobile telecommunications system (UMTS) terrestrial radio access network (UTRAN) system, or a global system for mobile communication (GSM)/enhanced data rate for GSM evolution (EDGE) system radio access network (GERAN) architecture, such as a vehicle-to-everything (vehicle to X, V2X) system, a device-to-device (D2D) system, a machine type communication (MTC) system or the like in the 5G system.

The technical solutions shown in the present disclosure can also be applied to other communication systems, such as an evolved communication system of a 5G system, etc., which are not limited in the present disclosure.

Figure 1:
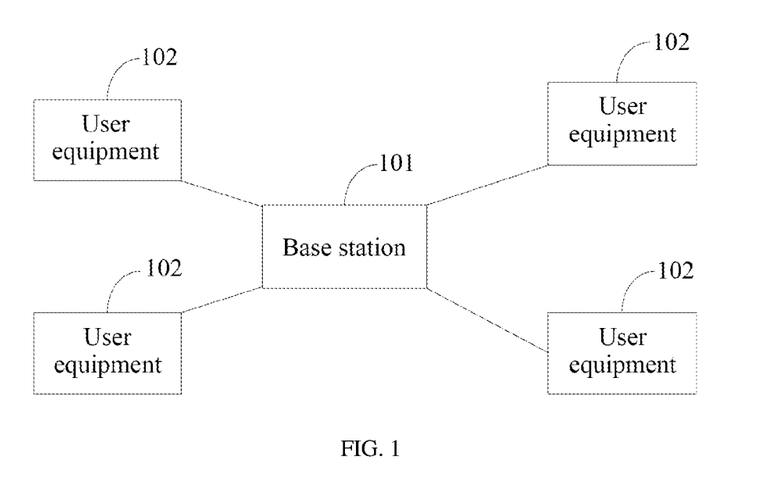
FIG. 1 is a schematic diagram of an application scenario of a communication method according to the present disclosure.

FIG. 1 is a schematic diagram of an application scenario of a communication method according to the present disclosure. As shown in FIG. 1, the communication system includes: a base station 101 and a user equipment 102. The user equipment 102 is a user equipment in a serving cell covered by the base station 101.

In an implementation, the user equipment 102 may be a mobile phone (or referred to as a "cellular" phone) or a computer with a mobile terminal, e.g., a portable, pocket-sized, hand-held, computer-built-in or vehicle-mounted mobile apparatus, or the like. In addition, the user equipment 102 may also be referred to as a mobile station (MS), a terminal, or a terminal equipment. In the present disclosure, an exemplary application scenario of the communication method is described by taking the number of user equipments 102 as 4, and the specific type and number of user equipments 102 are not limited here.

In a practical application, the base station 101 sends a paging indication (PI) physical downlink control channel (PDCCH) or a paging PDCCH to the user equipment 102, and the user equipment 102: monitors the paging indication PDCCH or the paging PDCCH to acquire paging indication information; acquires the paging indication information if the paging indication PDCCH or the paging PDCCH is detected; and if it is determined according to the paging indication information that monitoring the paging PDCCH or receiving the paging message scheduled by the paging PDCCH, monitors the paging PDCCH or receives the paging message scheduled by the paging PDCCH to acquire the paging message sent by the base station 101 to the user equipment 102. In the above process, if it is determined, according to the paging indication information, that monitoring the paging PDCCH or receiving the paging message scheduled by the paging PDCCH, then monitoring the paging PDCCH or receiving the paging message scheduled by the paging PDCCH reduces the number of times the user equipment monitors the paging PDCCH or receives the paging message scheduled by the paging PDCCH, thereby saving the power of the user equipment.

The technical solutions of the present disclosure will be described in detail below with specific embodiments. The following specific embodiments may be combined with each other, and the same or similar concepts or processes may not be repeated in some embodiments.

Figure 2:
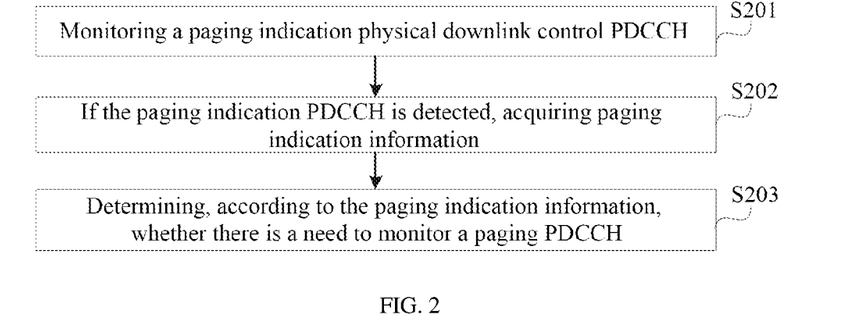
FIG. 2 is a schematic flowchart of a communication method according to an embodiment of the present disclosure.

FIG. 2 is a schematic flowchart of a communication method according to an embodiment of the present disclosure. As shown in FIG. 2, the communication method includes:

S201: monitoring a paging indication physical downlink control channel PDCCH.

In an implementation, the execution body of the embodiment of the present disclosure may be a user equipment, or may be a communication apparatus provided in the user equipment.

In an implementation, the communication apparatus may be implemented by a combination of software and/or hardware.

For example, when the communication apparatus is implemented by software, the communication apparatus may be a segment of codes stored in a storage area in a chip, and when a processor of the chip executes the segment of codes, the steps in the method embodiments of the present disclosure are implemented.

For example, when the communication apparatus is implemented by hardware, the communication apparatus may be, for example, a chip or a chip module, and the modules in the communication apparatus may include hardware modules such as the above-mentioned chip and chip module. When the communication apparatus is working, the steps in the method embodiments of the present disclosure may be executed.

For example, when the communication apparatus is implemented by combining with hardware, the modules of the communication apparatus include hardware such as a chip and a chip module, and a segment of codes stored in the chip. When the above chip and chip module are working, the above codes are executed to implement the steps in the method embodiments of the present disclosure.

Here, the paging indication PDCCH may be one type of PDCCH, and the paging PDCCH may also be one type of PDCCH. The paging indication PDCCH may be different from the paging PDCCH.

Generally speaking, monitoring a PDCCH is also called blind detection of the PDCCH. The user equipment monitors or blindly detects the PDCCH at a time-frequency position, but the base station may not necessarily send the PDCCH at the time-frequency position, so only through a CRC check can the user equipment determine whether the base station sends the PDCCH at the time-frequency position. Generally, the CRC check of the PDCCH being passed refers to that the user equipment detects the PDCCH, or the user equipment successfully detects the PDCCH, or the detection on the PDCCH by the user equipment is successful.

It should be noted that the cyclic redundancy check (CRC) of the paging indication PDCCH may be scrambled with a new radio network temporary identity (RNTI). In general, the user equipment may perform CRC scrambled by some type of RNTI to determine whether a certain type of PDCCH is successfully detected. For example, if the paging PDCCH corresponds to CRC scrambled by P-RNTI (paging-RNTI), the user equipment can perform CRC scrambled by P-RNTI to determine whether the paging PDCCH is successfully detected; if the paging indication PDCCH corresponds to PI-RNTI (paging indication-RNTI) scrambling, then the user equipment can perform CRC scrambled by PI-RNTI to determine whether the paging indication PDCCH is successfully detected.

In a possible design, the monitoring the paging indication PDCCH includes:

monitoring the paging indication PDCCH, on a paging indication PDCCH monitoring occasion;

where the paging indication PDCCH monitoring occasion satisfies any one of the following conditions;

before a first time instant and an offset from the first time instant is a first preset duration; or, after a first time instant and an offset from the first time instant is a first preset duration;

where the first time instant is a start time or an end time of a synchronization signal block (SS/PBCH block, SSB), a channel state information reference signal (CSI-RS), or a tracking reference signal (TRS). Specifically, the first time instant is a start time or an end time of a synchronization signal block, a channel state information reference signal, or a tracking reference signal (TRS) that is closest to the paging occasion or the first paging PDCCH monitoring occasions (PMO) within the paging occasion. Alternatively, the first time instant is a start time or an end time of a synchronization signal block, a channel state information reference signal, or a tracking reference signal that is before the paging occasion or the first paging PDCCH monitoring occasions within the paging occasion and is closest to the paging occasion or the first paging PDCCH monitoring occasions within the paging occasion. Alternatively, the first time instant is a start time or an end time of a synchronization signal block, a channel state information reference signal, or a tracking reference signal that is after the paging occasion or the first paging PDCCH monitoring occasions within the paging occasion and is closest to the paging occasion or the first paging PDCCH monitoring occasions within the paging occasion. In an implementation, the first time instant is a start time or an end time of a synchronization signal block, a channel state information reference signal or a tracking reference signal (TRS) that is closest to a paging frame (PF). Alternatively, the first time instant is a start time or an end time of a synchronization signal block, a channel state information reference signal or a tracking reference signal that is before a paging frame and is closest to the paging frame. Alternatively, the first time instant is a start time or an end time of a synchronization signal block, a channel state information reference signal or a tracking reference signal that is after a paging frame and is closest to the paging frame. The start time or the end time of the synchronization signal block may be the start time or the end time of a half frame or a frame where the synchronization signal block is located.

The above time instant may be a symbol, a time slot, or the like. Specifically, the above time instant is not limited in the present disclosure with regard to its specific value. The above first preset duration may be 1 millisecond, 2 milliseconds, 1 time slot, 2 time slots, or the like. Specifically, the first preset duration is not limited in the present disclosure with regard to its specific value. In a practical application, the first preset duration may be provided by a higher-level parameter in the communication system performing the communication method provided in the present disclosure, or may be derived by the user equipment through other higher-layer parameters. The first preset duration may also be a fixed duration.

In the present disclosure, the synchronization signal block, the channel state information reference signal and the tracking reference signal are periodic signals. One synchronization signal block consists of a primary synchronization signal (PSS), a secondary synchronization signal (SSS), and a physical broadcast channel (PBCH). Each synchronization signal block has a predetermined time domain position. This time domain position may also be referred to as a candidate synchronization signal block. Multiple synchronization signal blocks form one synchronization signal burst (SS-burst). Multiple synchronization signal bursts form a synchronization signal burst set (SS-burst-set). The time domain positions of Lmax synchronization signal blocks are fixed within a 5 ms window, where Lmax is an integer greater than or equal to 1. The time domain position indexes of the Lmax synchronization signal blocks are arranged consecutively, for example, the time domain position indexes are from 0 to Lmax−1. Therefore, the transmission time of a synchronization signal block within this 5 ms window is fixed, and the index is also fixed. Generally speaking, the base station adopts a beam sweeping way when sending the synchronization signal block, that is, the base station sends the synchronization signal block at different time domain positions through different beams. Accordingly, the user equipment can measure different beams and perceive which beam receives the strongest signal.

In the prior art, a paging occasion represents a time interval or a time window during which a group of user equipments monitor a paging PDCCH, and the base station might page one user equipment within one paging occasion, however, other user equipments will still detect the paging PDCCH (detect the paging PDCCH and the cyclic redundancy check is passed, or referred to as successfully detect the paging PDCCH, or referred to as detection of the paging PDCCH is successful), and then decode a paging message scheduled by the paging PDCCH and carried by a PDSCH, but the paging message does not contain these other user equipments therein, and these other user equipments will waste power in vain. In the present disclosure, however, the paging indication PDCCH may indicate before a paging occasion a user equipment subgroup that is actually paged in a subsequent paging occasion. In other words, the user equipment group corresponding to a paging occasion may be further divided into user equipment subgroups, and the paging indication PDCCH is used to indicate whether a user equipment subgroup is paged. In this way, the possibility of the user equipment monitoring the unnecessary paging PDCCH is reduced, which is beneficial to the energy saving of the user equipment.

It should be noted that one subgroup divided from a user equipment group corresponding to one paging occasion may be referred to as a user equipment subgroup. Generally speaking, one user equipment corresponding to one paging occasion or within a user equipment group will be configured by the base station with one user equipment subgroup. The base station allocates one user equipment subgroup to the user equipment through a higher-layer parameter (higher-layer signaling). This user equipment subgroup may be represented by one bit within one bitmap, or by one number or an index.

On the other hand, the time interval between the paging occasion or paging PDCCH (usually within the paging occasion) monitoring occasion of some user equipments and the above-mentioned periodic signal (synchronization signal block, channel state information reference signal or tracking reference signal) is relatively long, so that the time interval between the paging indication PDCCH (usually before the paging occasion or paging PDCCH) monitoring occasion and the above-mentioned periodic signal is relatively long. In this case, these user equipments need to keep some modules turned on after channel tracking through the periodic signal, in order to monitor the paging indication PDCCH in time when the paging indication PDCCH monitoring occasion arrives. In the above prior art, after the user equipment performs channel tracking through the periodic signal, it needs to keep some modules turned on, so that the user equipment cannot enter real sleep, and must wait to monitor the paging indication PDCCH until the paging indication PDCCH monitoring occasion arrives, resulting in relatively large power consumption of the user equipment. Therefore, in the present disclosure, the paging indication PDCCH monitoring occasion is before a first time instant and an offset from the first time instant is a first preset duration or, is after a first time instant and an offset from the first time instant is a first preset duration, so that the user equipment only needs to keep some modules turned on during the first preset duration, thereby saving the power of the user equipment. In other words, the user equipment performs the monitoring of the paging indication PDCCH in passing during the period of detecting or measuring the above periodic signal. Generally speaking, if the user equipment detects the paging indication PDCCH, and finds in the paging indication that it does not need to monitor a paging PDCCH, the user equipment may enter real sleep, otherwise, the user equipment needs to continue keeping some modules turned on, so as to monitor a paging PDCCH.

In a possible design, the monitoring the paging indication PDCCH includes:

monitoring the paging indication PDCCH, on a paging indication PDCCH monitoring occasion;

where the paging indication PDCCH monitoring occasion satisfies any one of the following conditions: before a second time instant and an offset from the second time instant is a second preset duration; the second time instant is a start time or an end time of a paging occasion, or a start time or an end time of a paging PDCCH monitoring occasion corresponding to a paging occasion, or a start time or an end time of the first paging PDCCH monitoring occasions corresponding to a paging occasion.

The above time instant may be a symbol, a time slot, or the like. Specifically, the above time instant is not limited in the present disclosure with regard to its specific value. The above second preset duration may be 1 millisecond, 2 milliseconds, 1 time slot, 2 time slots, or the like. Specifically, the second preset duration is not limited in the present disclosure with regard to its specific value. In a practical application, the second preset duration may be provided by a higher-layer parameter in the communication system performing the communication method provided in the present disclosure, or may be derived by the user equipment through other higher-layer parameters. The second preset duration may also be a fixed duration.

In the prior art, a paging occasion represents a time interval or a time window during which a group of user equipments monitor a paging PDCCH, and the base station might page one user equipment within one paging occasion, however, other user equipments will still detect the paging PDCCH (detect the paging PDCCH and the cyclic redundancy check is passed, or referred to as successfully detect the paging PDCCH, or referred to as detection of the paging PDCCH is successful), and then decode a paging message scheduled by the paging PDCCH and carried by a PDSCH, but the paging message does not contain these other user equipments therein, and these other user equipments will waste power in vain. In the present disclosure, however, the paging indication PDCCH may indicate before a paging occasion a user equipment subgroup that is actually paged in a subsequent paging occasion. In other words, the user equipment group corresponding to a paging occasion may be further divided into user equipment subgroups, and the paging indication PDCCH is used to indicate whether a user equipment subgroup is paged. In this way, the possibility of the user equipment monitoring the unnecessary paging PDCCH is reduced, which is beneficial to the energy saving of the user equipment.

It should be noted that one subgroup divided from a user equipment group corresponding to one paging occasion may be referred to as a user equipment subgroup. Generally speaking, one user equipment corresponding to one paging occasion or within a user equipment group will be configured by the base station with one user equipment subgroup. The base station allocates one user equipment subgroup to the user equipment through a higher-layer parameter. This user equipment subgroup may be represented by one bit within one bitmap, or by one number or an index.

On the other hand, when the paging indication PDCCH is closer to the paging occasion or the paging PDCCH corresponding to the paging occasion, the distance between the paging indication PDCCH and the paging PDCCH is reduced (assuming that the user equipment detects the paging indication PDCCH, and found in the paging indication that it needs to monitor a paging PDCCH), the user equipment only needs to wake up in a concentrated period of time to monitor the paging indication PDCCH and the paging PDCCH, and the user equipment does not need to keep some modules turned on for a long time, thereby saving the power of the user equipment.

S202: if the paging indication PDCCH is detected, acquiring paging indication information.

It should be noted that the paging indication PDCCH is a paging indication PDCCH sent by the base station, this paging indication PDCCH includes paging indication information, and this paging indication information is used to indicate whether the user equipment needs to monitor a paging PDCCH.

Generally, the detection of the paging indication PDCCH refers to the detection of the paging indication PDCCH and the failure of the CRC check, or referred to as the successful detection of the paging indication PDCCH, or referred to as the detection of the paging indication PDCCH is successful.

On the other hand, if the paging indication PDCCH is not detected (the paging indication PDCCH is detected but the CRC check fails, or referred to as the paging indication PDCCH is not successfully detected, or referred to as the detection of the paging indication PDCCH is not successful), determining not to monitor or to monitor a paging PDCCH. Generally speaking, as for whether monitoring or not monitoring, the selection can be obtained according to the higher-layer parameter, for example, obtained according to the parameter or configuration in the system information.

Different from the prior art, where the paging occasion is intended for a group of user equipments, and the paging message scheduled by the paging PDCCH monitored by the user equipment does not include this user equipment, which causes the user equipment to monitor an unnecessary paging PDCCH, which in turn leads to relatively large power consumption of the user equipment. In the present disclosure, when it is determined according to the paging indication information that whether to monitor the paging PDCCH, the possibility of monitoring the paging PDCCH is reduced, the number of times the user equipment monitors the paging PDCCH is reduced, and the power of the user equipment is saved.

In a possible design, the acquiring the paging indication information includes: acquiring the paging indication information from a target bit in downlink control information DCI or a downlink control information DCI format corresponding to the paging indication PDCCH.

In another possible design, the acquiring the paging indication information includes: acquiring the paging indication information from a physical downlink shared channel PDSCH scheduled by the paging indication PDCCH.

In an implementation, the target bit may be a reserved bit in the DCI or the DCI format.

In an implementation, the target bit may also be a bit repurposed in an existing field in the DCI or the DCI format.

In a possible design, the paging indication information may be a bitmap, and the bitmap at least includes a bit corresponding to a user equipment subgroup corresponding to the user equipment.

In another possible design, the paging indication information is a number or an index of a user equipment subgroup.

S203: determining, according to the paging indication information, whether to monitor a paging PDCCH.

In an implementation, when the paging indication information is a bitmap, the bitmap at least includes a bit corresponding to a user equipment subgroup corresponding to the user equipment, and it is possible to determine, according to the bit corresponding to the user equipment subgroup to which the user equipment corresponds or belongs, whether to monitor a paging PDCCH.

For example, if the bit is 1, determining to monitor the paging PDCCH; if the bit is 0, determining not to monitor the paging PDCCH.

For example, if the bit is 0, determining to monitor the paging PDCCH; if the bit is 1, determining not to monitor the paging PDCCH.

Generally speaking, the bitmap may include a bit corresponding to each user equipment subgroup. Which bit in the bitmap corresponds to this user equipment subgroup to which the user equipment corresponds or belongs is notified to the user equipment by the base station through a high layer parameter (signaling). For example, the bitmap is 010, the three bits from left to right are respectively directed at three user equipment subgroups, and the user equipment subgroup to which the user equipment corresponds or belongs is the second subgroup from left to right, then the corresponding bit is 1.

In an implementation, when the paging indication information is a number or an index of a user equipment subgroup, it is possible to determine whether to monitor a paging PDCCH, according to whether the number or index of the user equipment subgroup to which the user equipment corresponds or belongs is equal to the number or index of the user equipment subgroup within the paging indication information.

Generally speaking, the number or index of the user equipment subgroup may also be referred to as a number or an index of a target user equipment subgroup, that is, the number or index of the indicated or paged or awakened user equipment subgroup. For example, the binary number of the paging indication information is 011, the lowest digit is on the right, then the decimal value of the number or index is 3, indicating that the indicated or paged or awakened user equipment subgroup is the third one of user equipment subgroups.

In S203, since the user equipment subgroup is introduced, the possibility of monitoring the paging PDCCH is reduced, and the power of the user equipment can be saved.

Different from the prior art, where the paging occasion is intended for a group of user equipments, and the paging message scheduled by the paging PDCCH monitored by the user equipment does not include this user equipment, which causes the user equipment to monitor an unnecessary paging PDCCH, which in turn leads to relatively large power consumption of the user equipment. In the present disclosure, when it is determined, according to the paging indication information, whether to monitor a paging PDCCH, the possibility of monitoring the paging PDCCH is reduced, the number of times the user equipment monitors the paging PDCCH is reduced, and the power of the user equipment is saved.

The communication method provided in the present disclosure includes:
  monitoring a paging indication PDCCH, on a paging indication PDCCH monitoring occasion; if the paging indication PDCCH is detected, acquiring paging indication information, and determining, according to the paging indication information, whether to monitor a paging PDCCH. In the above method, determining, according to the paging indication information, whether to monitor the paging PDCCH can reduce the possibility of the user equipment monitoring the paging PDCCH, thereby saving the power of the user equipment.

On the basis of the above embodiment, another communication method according to the present disclosure will be described in detail below with reference to FIG. 3. For details, please refer to the embodiment in FIG. 3.

Figure 3:
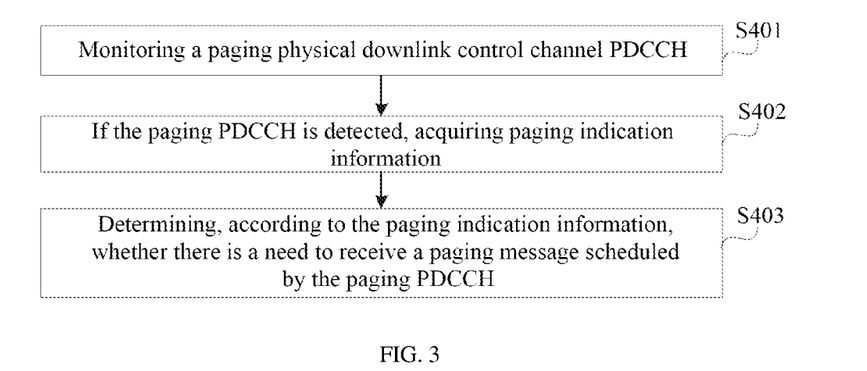
FIG. 3 is a schematic flowchart of another communication method according to an embodiment of the present disclosure.

FIG. 3 is a schematic flowchart of another communication method according to an embodiment of the present disclosure. As shown in FIG. 3, the communication method includes:
  S301: monitoring a paging physical downlink control channel PDCCH.

In general, the paging PDCCH is used to schedule a paging message (carried by a PDSCH).

S302: if the paging PDCCH is detected, acquiring paging indication information.

In an implementation, acquiring the paging indication information from a target bit in downlink control information DCI or a downlink control information DCI format corresponding to the paging PDCCH, where the target bit is: a reserved bit in the DCI or the DCI format.

In an implementation, the target bit in the DCI or the DCI format corresponding to the paging PDCCH is 6 in number.

In an implementation, the paging indication information is a bitmap, and the bitmap at least includes a bit corresponding to a user equipment subgroup corresponding to the user equipment.

In an implementation, the paging indication information may further include at least a number or an index of a user equipment subgroup corresponding to the user equipment.

Generally, the detection of the paging PDCCH refers to the detection of the paging PDCCH and the failure of the CRC check, or referred to as the successful detection of the paging PDCCH, or referred to as the detection of the paging PDCCH is successful.

S303: determining, according to the paging indication information, whether to receive a paging message scheduled by the paging PDCCH.

In an implementation, if the paging indication information is a bitmap, it can be determined, according to a bit corresponding to a user equipment subgroup corresponding to the user equipment that is included in the bitmap, whether to receive a paging message scheduled by the paging PDCCH.

For example: if the bit is 1, determining to receive the paging message scheduled by the paging PDCCH; if the bit is 0, determining not to receive the paging message scheduled by the paging PDCCH.

For example: if the bit is 0, determining not to receive the paging message scheduled by the paging PDCCH; if the bit is 1, determining to receive the paging message scheduled by the paging PDCCH.

Generally speaking, the bitmap may include a bit corresponding to each user equipment subgroup. Which bit in the bitmap corresponds to this user equipment subgroup to which the user equipment corresponds or belongs is notified to the user equipment by the base station through a higher-layer parameter (signaling). For example, the bitmap is 010, the three bits from left to right are respectively directed at three user equipment subgroups, and the user equipment subgroup to which the user equipment corresponds or belongs is the second subgroup from left to right, then the corresponding bit is 1.

In an implementation, if the paging indication information includes at least a number or an index of a user equipment subgroup corresponding to the user equipment, it can be determined whether to receive the paging message scheduled by the paging PDCCH, according to whether the number or index of the user equipment subgroup to which the user equipment belongs is equal to the number or index of the user equipment subgroup within the paging indication information to which the user equipment belongs. Determining whether to receive the paging message scheduled by the paging PDCCH.

For example, if the number (or index) of the user equipment subgroup to which the user equipment belongs is equal to the number (or index) of the user equipment subgroup within the paging indication information to which the user equipment belongs, determining to receive the paging message scheduled by the paging PDCCH; if the number (or index) of the user equipment subgroup to which the user equipment belongs is not equal to the number (or index) of the user equipment subgroup within the paging indication information to which the user equipment belongs, determining not to receive the paging message scheduled by the paging PDCCH.

Generally speaking, the number or index of the user equipment subgroup may also be referred to as a number or an index of a target user equipment subgroup, that is, the number or index of the indicated or paged or awakened user equipment subgroup. For example, the binary number of the paging indication information is 011, the lowest digit is on the right, then the decimal value of the number or index is 3, indicating that the indicated or paged or awakened user equipment subgroup is the third one of user equipment subgroups.

The communication method according to the present disclosure includes: monitoring a paging PDCCH; if the paging PDCCH is detected, acquiring paging indication information; determining, according to the paging indication information, whether to receive a paging message scheduled by the paging PDCCH. In the above process, determining, according to the paging indication information, whether to receive the paging message scheduled by the paging PDCCH can prevent the user equipment from receiving an unrelated paging message under assurance that the user equipment correctly receives the paging message sent thereto by the base station, thereby saving the power of the user equipment.

Further, in the embodiment of the present disclosure, acquiring the paging indication information from a target bit in DCI or a DCI format corresponding to the paging PDCCH; when the paging indication information is a bitmap, the bitmap includes a bit corresponding to each user equipment subgroup. If the bit corresponding to the user equipment subgroup to which the user equipment belongs is 1 (or 0), determining to receive the paging message scheduled by the paging PDCCH; if the bit corresponding to the user equipment subgroup to which the user equipment belongs is 0 (or 1), determining not to receive the paging message scheduled by the paging PDCCH; when the paging indication information is the number or index of the user equipment subgroup to which the user equipment belongs, determining whether the number or index of the user equipment subgroup to which the user equipment belongs is the same as the received number or index of the user equipment subgroup; if yes, determining to receive the paging message scheduled by the paging PDCCH; if no, determining not to receive the paging message scheduled by the paging PDCCH.

In the above method, since the user equipment subgroup is introduced, the user equipment can be prevented from receiving an unrelated paging message under assurance that the user equipment correctly receives the paging message sent thereto by the base station, thereby saving the power of the user equipment.

Figure 4:
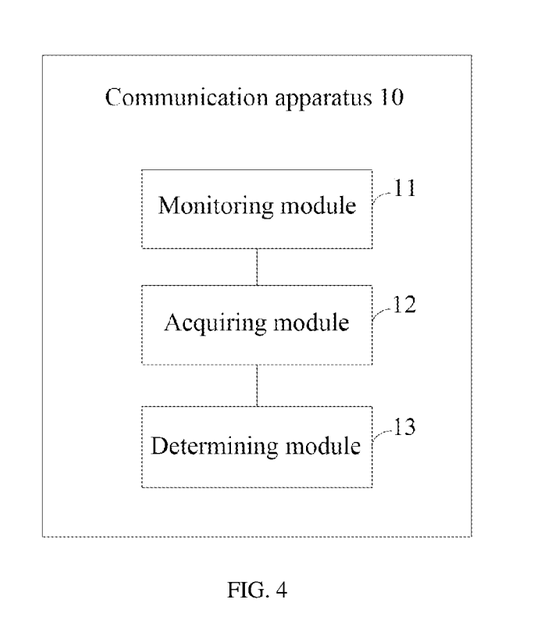
FIG. 4 is a schematic structural diagram of a communication apparatus according to an embodiment of the present disclosure.

FIG. 4 is a schematic structural diagram of a communication apparatus according to an embodiment of the present disclosure. The communication apparatus 10 is provided in a user equipment, and the communication apparatus 10 includes: a monitoring module 11, an acquiring module 12 and a determining module 13, where:

the monitoring module 11 is configured to monitor a paging indication physical downlink control channel PDCCH;

the acquiring module 12 is configured to acquire paging indication information if the paging indication PDCCH is detected; and the determining module 13 is configured to determine, according to the paging indication information, whether to monitor a paging PDCCH.

The communication apparatus 10 provided in the embodiment of the present disclosure can execute the above method and the technical solutions shown in the embodiments of FIG. 2 and FIG. 3; the implementation principles and beneficial effects therebetween are similar, and details are not repeated here.

In a possible design, the monitoring module 11 is specifically configured to:
monitor the paging indication PDCCH, on a paging indication PDCCH monitoring occasion;
where the paging indication PDCCH monitoring occasion satisfies any one of the following conditions: before a first time instant, and an offset from the first time instant is a first preset duration; or, after a first time instant and an offset from the first time instant is a first preset duration;
where the first time instant is a start time or an end time of a synchronization signal block, or a channel state information reference signal, or a tracking reference signal.

In a possible design, the acquiring module 12 is specifically configured to:
acquire the paging indication information from a target bit in downlink control information DCI or a downlink control information DCI format corresponding to the paging indication PDCCH.

In a possible design, the target bit is:
a reserved bit in the DCI or the DCI format.

In a possible design, the target bit is:
a bit repurposed in an existing field in the DCI or the DCI format.

In a possible design, the acquiring module 12 is specifically configured to:
acquire the paging indication information from a paging message scheduled by the paging indication PDCCH.

In a possible design, the paging indication information is a bitmap, and the bitmap at least includes a bit corresponding to a user equipment subgroup corresponding to the user equipment.

In a possible design, the paging indication information is a number or an index of a user equipment subgroup.

In a possible design, the determining module 13 is specifically configured to:
if the bit is 1, determine to monitor the paging PDCCH;
if the bit is 0, determine not to monitor the paging PDCCH.

In a possible design, the determining module 13 is specifically configured to:
if the bit is 0, determine to monitor the paging PDCCH;
if the bit is 1, determine not to monitor the paging PDCCH.

In another possible design, the monitoring module 11 is specifically configured to:
monitor the paging indication PDCCH, on a paging indication PDCCH monitoring occasion;
where the paging indication PDCCH monitoring occasion satisfies any one of the following conditions: before a second time instant and an offset from the second time instant is a second preset duration; the second time instant is a start time or an end time of a paging occasion, or a start time or an end time of a paging PDCCH monitoring occasion corresponding to a paging occasion.

In a possible design, the acquiring module 12 is specifically configured to:
acquire the paging indication information from a target bit in DCI or a DCI format corresponding to the paging indication PDCCH.

In another possible design, the target bit is:
a reserved bit in the DCI or the DCI format.

In another possible design, the target bit is:
a bit repurposed in an existing field in the DCI or the DCI format.

In another possible design, the acquiring module 12 is specifically configured to:
acquire the paging indication information from a PDSCH scheduled by the paging indication PDCCH.

In another possible design, the paging indication information is a bitmap, and the bitmap at least includes a bit corresponding to a user equipment subgroup corresponding to the user equipment.

In another possible design, the paging indication information is a number or an index of a user equipment subgroup.

In another possible design, the determining module 13 is specifically configured to:
if the bit is 1, determine to monitor the paging PDCCH;
if the bit is 0, determine not to monitor the paging PDCCH.

In another possible design, the determining module 13 is specifically configured to:
if the bit is 0, determine to monitor the paging PDCCH;
if the bit is 1, determine not to monitor the paging PDCCH.

The communication apparatus 10 provided in the embodiment of the present disclosure can execute the above method and the technical solutions shown in the embodiments of FIG. 2; the implementation principles and beneficial effects therebetween are similar, and details are not repeated here.

Figure 5:
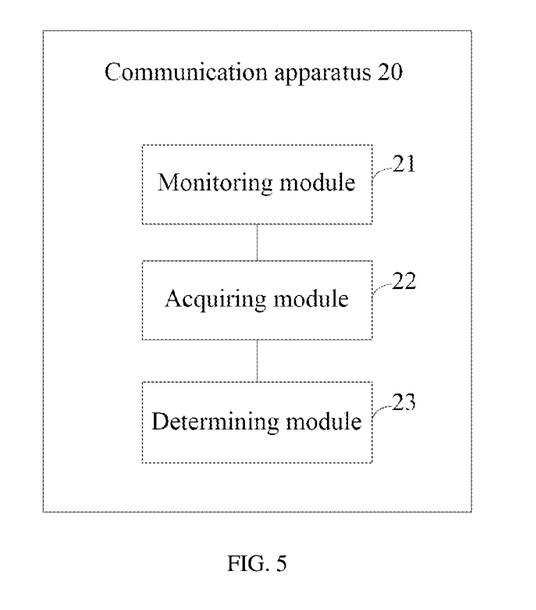
FIG. 5 is a schematic structural diagram of another communication apparatus according to an embodiment of the present disclosure.

FIG. 5 is a schematic structural diagram of another communication apparatus according to an embodiment of the present disclosure. The communication apparatus 20 is applied to a user equipment, and includes: a monitoring module 21, an acquiring module 22 and a determining module 23, where:
the monitoring module 21 is configured to monitor a paging physical downlink control channel PDCCH;
the acquiring module 22 is configured to acquire paging indication information if the paging PDCCH is detected; and
the determining module 23 is configured to determine, according to the paging indication information, whether to receive a paging message scheduled by the paging PDCCH.

The communication apparatus 20 provided in the embodiment of the present disclosure can execute the above method and the technical solutions shown in the embodiments of FIG. 3; the implementation principles and beneficial effects therebetween are similar, and details are not repeated here.

In a possible design, the acquiring module 22 is specifically configured to:
acquire the paging indication information from a target bit in DCI or a DCI format corresponding to the paging PDCCH.

In a possible design, the target bit is:
a reserved bit in the DCI or the DCI format.

In a possible design, the paging indication information is a bitmap, and the bitmap at least includes a bit corresponding to a user equipment subgroup corresponding to the user equipment.

In a possible design, the paging indication information is a number or an index of a user equipment subgroup.

In a possible design, the determining module 23 is specifically configured to:

if the bit is 1, determine to receive the paging message scheduled by the paging PDCCH;

if the bit is 0, determine not to receive the paging message scheduled by the paging PDCCH.

In a possible design, the determining module 23 is specifically configured to:

if the bit is 0, determine to receive the paging message scheduled by the paging PDCCH;

if the bit is 1, determine not to receive the paging message scheduled by the paging PDCCH.

The communication apparatus 20 provided in the embodiment of the present disclosure can execute the above technical solutions shown in the embodiments of FIG. 4; the implementation principles and beneficial effects therebetween are similar, and details are not repeated here.

Figure 6:
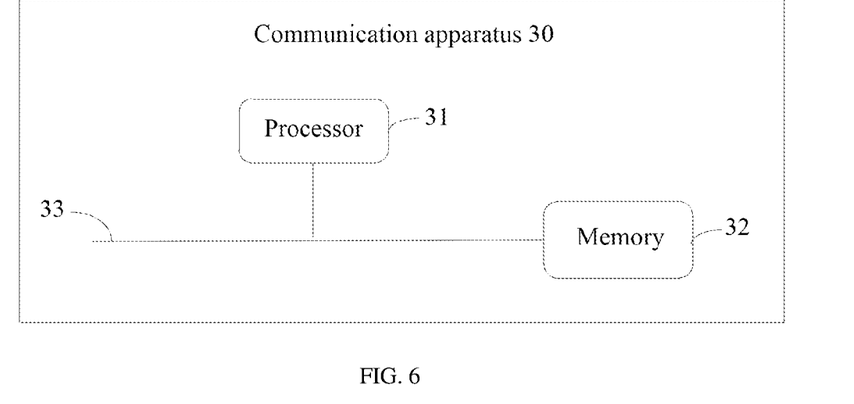
FIG. 6 is a schematic diagram of a hardware structure of a communication apparatus according to an embodiment of the present disclosure.

FIG. 6 is a schematic diagram of a hardware structure of a communication apparatus according to an embodiment of the present disclosure. As shown in FIG. 6, the communication apparatus 30 includes: a processor 31 and a memory 32, where the processor 31 and the memory 32 are connected through a bus 33.

In a specific implementation process, the processor 31 performs a computer-executable instruction stored in the memory 32, so that the processor 31 performs the communication method in the above embodiments of FIG. 2 and FIG. 3.

For the specific implementation process of the processor 31, reference may be made to the foregoing method embodiments, the implementation principles and technical effects therebetween are similar, the details are not described herein again in this embodiment.

Figure 7:
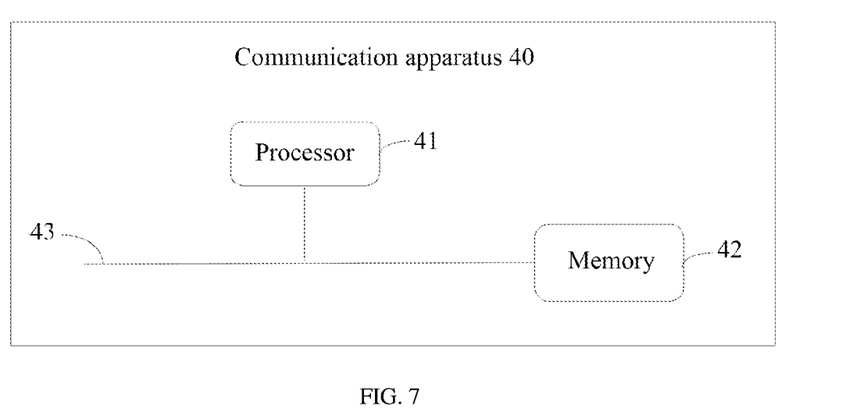
FIG. 7 is a schematic diagram of a hardware structure of another communication apparatus according to an embodiment of the present disclosure.

FIG. 7 is a schematic diagram of a hardware structure of another communication apparatus according to an embodiment of the present disclosure. As shown in FIG. 7, the communication apparatus 40 includes: a processor 41 and a memory 42, where the processor 41 and the memory 42 are connected through a bus 43.

In a specific implementation process, the processor 41 performs a computer-executable instruction stored in the memory 42, so that the processor 41 performs the communication method in the above embodiments of FIG. 4 and FIG. 5.

For the specific implementation process of the processor 41, reference may be made to the foregoing method embodiments, the implementation principles and technical effects therebetween are similar, the details are not described herein again in this embodiment.

In the above embodiments shown in FIG. 6-FIG. 7, the communication apparatus may be a user equipment, and the communication apparatus may be a hardware device including a communication device. It should be understood that the processor may be a central processing unit (CPU), also may be other general-purpose processors, digital signal processor (DSP), application specific integrated circuits (ASIC), etc. A general purpose processor may be a microprocessor or this processor may be any conventional processor or the like. The steps of the method disclosed in conjunction with the invention can be directly embodied as being executed by a hardware processor, or executed by a combination of hardware and software modules in the processor.

The memory may include a high-speed RAM memory, and may also include a non-volatile memory NVM, such as a disk memory.

The bus may be an industry standard architecture (ISA) bus, a peripheral component interconnect (PCI) bus, or an extended industry standard architecture (EISA) bus, or the like. The bus can be divided into an address bus, a data bus, a control bus and so on. For convenience of representation, the buses in the drawings of the present disclosure are not limited to only one bus or one type of bus.

The present disclosure further provides a computer-readable storage medium having stored therein a computer-executable instruction, where when a processor executes the computer-executable instruction, the technical solutions shown in the embodiments of FIG. 2 to FIG. 3 above are implemented.

The present disclosure further provides another computer-readable storage medium having stored therein a computer-executable instruction, where when a processor executes the computer-executable instruction, the technical solutions shown in the embodiments of FIG. 4 to FIG. 5 above are implemented.

The above computer-readable storage medium, the above readable storage medium may be realized by any type of volatile or non-volatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The readable storage medium may be any available medium that can be accessed by a general purpose or special purpose computer.

An exemplary readable storage medium is coupled to the processor such that the processor can read information from, and write information to, the readable storage medium. Of course, the readable storage medium may also be an integral part of the processor. The processor and the readable storage medium may be located in application specific integrated circuits (ASIC). Of course, the processor and the readable storage medium may also exist in the device as discrete components.

The division of units is only a logical function division, and other division methods may be used in actual implementation, for example, multiple units or components may be combined or integrated into another system, or some features may be ignored or not implemented. On the other hand, the shown or discussed mutual coupling or direct coupling or communication connection may be through some interfaces, indirect coupling or communication connection of apparatuses or units, and may be in electrical, mechanical or other forms.

Units described as separate components may or may not be physically separated, and components shown as units may or may not be physical units, that is, may be located in one place, or may be distributed onto multiple network units. Some or all of the units may be selected according to actual needs to achieve the objective of the solution in this embodiment.

In addition, each functional unit in each embodiment of the present disclosure may be integrated into one processing unit, or each unit may exist physically alone, or two or more units may be integrated into one unit.

The functions, if implemented in the form of software functional units and sold or used as stand-alone products, may be stored in a computer-readable storage medium. Based on this understanding, the technical solution of the present disclosure, or the part that contributes to the prior art or the part of the technical solution may be embodied in the form of a software product in essence. This computer software product is stored in a storage medium, including several instructions enabling a computer device (which may be a personal computer, a server, or a network device, etc.) to execute all or part of the steps of the methods of the each embodiment of the present disclosure. The aforementioned storage medium includes: U disk, mobile hard disk, read-only memory (ROM), random access memory (RAM), magnetic disk or optical disk and other media that can store program codes.

Those of ordinary skill in the art can understand that all or part of the steps of implementing the above method embodiments may be completed by program instructions related hardware. The aforementioned program can be stored in a computer-readable storage medium. When the program is executed, it executes the steps included in the above method embodiments; and the aforementioned storage medium includes: ROM, RAM, magnetic disk or optical disk and various media that can store program codes.

Finally, it should be noted that the above embodiments are only used to illustrate the technical solutions of the present disclosure, but not to limit them; although the present disclosure has been described in detail with reference to the foregoing embodiments, those of ordinary skill in the art should understand that: the technical solutions described in the foregoing embodiments can still be modified, or some or all of the technical features thereof can be equivalently replaced; and these modifications or replacements do not make the essence of the respective technical solutions deviate from the scope of the technical solutions of each embodiment of the present disclosure.

Embodiments of the present disclosure provide a communication method and apparatus, which can reduce the number of times a user equipment monitors a paging PDCCH or receives a paging message, thereby saving power of the user equipment.

In a first aspect, an embodiment of the present disclosure provides a communication method, which is applied to a user equipment and includes:

monitoring a paging indication PDCCH;

if the paging indication PDCCH is detected, acquiring paging indication information; and determining, according to the paging indication information, whether to monitor a paging PDCCH.

In a possible design, the monitoring the paging indication PDCCH includes:

monitoring the paging indication PDCCH, on a paging indication PDCCH monitoring occasion;

where before a first time instant, and an offset from the first time instant is a first preset duration; or, after a first time instant and an offset from the first time instant is a first preset duration, and the first time instant is a start time or an end time of a synchronization signal block, or channel state information reference signal, or a tracking reference signal.

In another possible design, the acquiring the paging indication information includes:

acquiring the paging indication information from a target bit in downlink control information DCI or a downlink control information DCI format corresponding to the paging indication PDCCH.

In another possible design, the target bit is:
a reserved bit in the DCI or the DCI format.

In another possible design, the target bit is:
a bit repurposed in an existing field in the DCI or the DCI format.

In another possible design, the acquiring the paging indication information includes:

acquiring the paging indication information from a physical downlink shared channel PDSCH scheduled by the paging indication PDCCH.

In another possible design, the paging indication information is a bitmap, and the bitmap at least includes a bit corresponding to a user equipment subgroup corresponding to the user equipment.

In another possible design, the paging indication information is a number or an index of a user equipment subgroup.

In another possible design, the determining, according to the paging indication information, whether to monitor the paging PDCCH includes:

if the bit is 1, determining to monitor the paging PDCCH;

if the bit is 0, determining not to monitor the paging PDCCH.

In another possible design, the determining, according to the paging indication information, whether to monitor the paging PDCCH includes:

if the bit is 0, determining to monitor the paging PDCCH;

if the bit is 1, determining not to monitor the paging PDCCH.

In another possible design, the monitoring the paging indication PDCCH includes:

monitoring the paging indication PDCCH, on a paging indication PDCCH monitoring occasion;

where the paging indication PDCCH monitoring occasion satisfies any one of the following conditions: before a second time instant and an offset from the second time instant is a second preset duration; the second time instant is a start time or an end time of a paging occasion, or a start time or an end time of a paging PDCCH monitoring occasion corresponding to a paging occasion.

In another possible design, the acquiring the paging indication information includes:

acquiring the paging indication information from a target bit in DCI or a DCI format corresponding to the paging indication PDCCH.

In another possible design, the target bit is:
a reserved bit in the DCI or the DCI format.

In another possible design, the target bit is:
a bit repurposed in an existing field in the DCI or the DCI format.

In another possible design, the monitoring the paging indication PDCCH to acquire the paging indication information includes:

acquiring the paging indication information from a PDSCH scheduled by the paging indication PDCCH.

In another possible design, the paging indication information is a bitmap, and the bitmap at least includes a bit corresponding to a user equipment subgroup corresponding to the user equipment.

In another possible design, the paging indication information is a number or an index of a user equipment subgroup.

In another possible design, the determining, according to the paging indication information, whether to monitor the paging PDCCH includes:

if the bit is 1, determining to monitor the paging PDCCH;

if the bit is 0, determining not to monitor the paging PDCCH.

In another possible design, the determining, according to the paging indication information, whether to monitor the paging PDCCH includes:
if the bit is 0, determining to monitor the paging PDCCH;
if the bit is 1, determining not to monitor the paging PDCCH.

In a second aspect, an embodiment of the present disclosure provides a communication method which is applied to a user equipment and includes:
monitoring a paging PDCCH;
if the paging PDCCH is detected, acquiring paging indication information;
determining, according to the paging indication information, whether to receive a paging message scheduled by the paging PDCCH.

In a possible design, the acquiring the paging indication information includes:
acquiring the paging indication information from a target bit in downlink control information DCI or a downlink control information DCI format corresponding to the paging PDCCH.

In another possible design, the target bit is:
a reserved bit in the DCI or the DCI format.

In another possible design, the paging indication information is a bitmap, and the bitmap at least includes at least a bit corresponding to a user equipment subgroup corresponding to the user equipment.

In another possible design, the paging indication information is a number or an index of a user equipment subgroup.

In another possible design, the determining, according to the paging indication information, whether to receive the paging message scheduled by the paging PDCCH includes:
if the bit is 1, determining to receive the paging message scheduled by the paging PDCCH;
if the bit is 0, determining not to receive the paging message scheduled by the paging PDCCH.

In another possible design, the determining, according to the paging indication information, whether to receive the paging message scheduled by the paging PDCCH includes:
if the bit is 1, determining to receive the paging message scheduled by the paging PDCCH;
if the bit is 0, determining not to receive the paging message scheduled by the paging PDCCH.

In a third aspect, an embodiment of the present disclosure provides a communication apparatus, which is applied to a user equipment and includes: a monitoring module, an acquiring module, and a determining module, where:
the monitoring module is configured to monitor a paging indication physical downlink control channel PDCCH;
the acquiring module is configured to acquire paging indication information if the paging indication PDCCH is detected; and
the determining module is configured to determine, according to the paging indication information, whether to monitor a paging PDCCH.

In a possible design, the monitoring module is specifically configured to:
monitor the paging indication PDCCH, on a paging indication PDCCH monitoring occasion;
where the paging indication PDCCH monitoring occasion satisfies any one of the following conditions: before a first time instant, and an offset from the first time instant is a first preset duration; or, after a first time instant and an offset from the first time instant is a first preset duration, and the first time instant is a start time or an end time of a synchronization signal block, or a channel state information reference signal, or a tracking reference signal.

In another possible design, the acquiring module is specifically configured to:
acquire the paging indication information from a target bit in downlink control information DCI or a downlink control information DCI format corresponding to the paging indication PDCCH.

In another possible design, the target bit is:
a reserved bit in the DCI or the DCI format.

In another possible design, the target bit is:
a bit repurposed in an existing field in the DCI or the DCI format.

In another possible design, the acquiring module is specifically configured to:
acquire the paging indication information from a physical downlink shared channel PDSCH scheduled by the paging indication PDCCH.

In another possible design, the paging indication information is a bitmap, and the bitmap at least includes a bit corresponding to a user equipment subgroup corresponding to the user equipment.

In another possible design, the paging indication information is a number or an index of a user equipment subgroup.

In another possible design, the determining module is specifically configured to:
if the bit is 1, determine to monitor the paging PDCCH;
if the bit is 0, determine not to monitor the paging PDCCH.

In another possible design, the determining module is specifically configured to:
if the bit is 0, determine to monitor the paging PDCCH;
if the bit is 1, determine not to monitor the paging PDCCH.

In a possible design, the monitoring module is specifically configured to:
monitor the paging indication PDCCH, on a paging indication PDCCH monitoring occasion;
where the paging indication PDCCH monitoring occasion satisfies any one of the following conditions: before a second time instant and an offset from the second time instant is a second preset duration; the second time instant is a start time or an end time of a paging occasion, or a start time or an end time of a paging PDCCH monitoring occasion corresponding to a paging occasion.

In a possible design, the acquiring module is specifically configured to:
acquire the paging indication information from a target bit in DCI or a DCI format corresponding to the paging indication PDCCH.

In another possible design, the target bit is:
a reserved bit in the DCI or the DCI format.

In another possible design, the target bit is:
a bit repurposed in an existing field in the DCI or the DCI format.

In another possible design, the acquiring module is specifically configured to:
acquire the paging indication information from a PDSCH scheduled by the paging indication PDCCH.

In another possible design, the paging indication information is a bitmap, and the bitmap at least includes a bit corresponding to a user equipment subgroup corresponding to the user equipment.

In another possible design, the paging indication information is a number or an index of a user equipment subgroup.

In another possible design, the determining module is specifically configured to:
if the bit is 1, determine to monitor the paging PDCCH;
if the bit is 0, determine not to monitor the paging PDCCH.

In another possible design, the determining module is specifically configured to:
if the bit is 0, determine to monitor the paging PDCCH;
if the bit is 1, determine not to monitor the paging PDCCH.

In a fourth aspect, an embodiment of the present disclosure provides a communication apparatus, which is applied to a user equipment and includes: a monitoring module, an acquiring module, and a determining module, where:
the monitoring module is configured to monitor a paging physical downlink control channel PDCCH;
the acquiring module is configured to acquire paging indication information if the paging PDCCH is detected;
the determining module is configured to determine, according to the paging indication information, whether to receive the paging message scheduled by the paging PDCCH.

In a possible design, the acquiring module is specifically configured to:
acquire the paging indication information from a target bit in downlink control information DCI or a downlink control information DCI format corresponding to the paging PDCCH.

In another possible design, the target bit is:
a reserved bit in the DCI or the DCI format.

In another possible design, the paging indication information is a bitmap, and the bitmap at least includes a bit corresponding to a user equipment subgroup corresponding to the user equipment.

In another possible design, the paging indication information is a number or an index of a user equipment subgroup.

In another possible design, the determining module is specifically configured to:
if the bit is 1, determining to receive the paging message scheduled by the paging PDCCH;
if the bit is 0, determine not to receive the paging message scheduled by the paging PDCCH.

In another possible design, the determining module is specifically configured to:
if the bit is 1, determine to receiving the paging message scheduled by the paging PDCCH;
if the bit is 0, determine not to receive the paging message scheduled by the paging PDCCH.

In a fifth aspect, an embodiment of the present disclosure provides a communication apparatus, including: a processor and a memory;
where the memory stores a computer-executable instruction;
the processor performs the computer-executable instruction stored in the memory, so that the processor performs the communication method described above in any item of the first aspect.

In a sixth aspect, an embodiment of the present disclosure provides a communication apparatus, including: a processor and a memory;
where the memory stores a computer-executable instruction;
the processor performs the computer-executable instruction stored in the memory, so that the processor performs the communication method described above in any item of the second aspect.

In a seventh aspect, an embodiment of the present disclosure provides a computer-readable storage medium having stored therein a computer-executable instruction, where when a processor performs the computer-executable instruction, the communication method described above in any item of the first aspect is implemented.

In an eighth aspect, an embodiment of the present disclosure provides a computer-readable storage medium having stored therein a computer-executable instruction, where when a processor performs the computer-executable instruction, the communication method described above in any item of the second aspect is implemented.

In the communication method and apparatus according to the present disclosure, the method includes: monitoring a paging indication physical downlink control channel PDCCH or a paging physical downlink control channel PDCCH to acquire paging indication information; acquiring paging indication information, if the monitored paging indication PDCCH or paging PDCCH is detected; determining, according to the paging indication information, whether to monitor the paging PDCCH or receive a paging message scheduled by the paging PDCCH. In the above method, the determining, according to the paging indication information, whether to monitor the paging PDCCH or receive the paging message scheduled by the paging PDCCH can reduce the number of times the paging PDCCH is monitored or the paging message scheduled by the paging PDCCH is received, thereby saving the power of the user equipment.

The invention claimed is:

1. A communication method applied to user equipment, comprising:
monitoring a paging indication physical downlink control channel (PDCCH);
if the paging indication PDCCH is detected, acquiring paging indication information; and
determining, according to the paging indication information, whether to monitor a paging PDCCH;
wherein the acquiring the paging indication information comprises acquiring the paging indication information from a target bit in downlink control information (DCI) or a DCI format corresponding to the paging indication PDCCH;
wherein the paging indication information is a bitmap, and the bitmap at least comprises a bit corresponding to a user equipment subgroup corresponding to the user equipment;
wherein the determining, according to the paging indication information, whether to monitor the paging PDCCH comprises:
if the bit is 1, determining to monitor the paging PDCCH; or
if the bit is 0, determining not to monitor the paging PDCCH;
wherein the monitoring the paging indication PDCCH comprises monitoring the paging indication PDCCH, on a paging indication PDCCH monitoring occasion;
wherein the paging indication PDCCH monitoring occasion satisfies: before a second time instant and an offset from the second time instant is a second preset duration; the second time instant is a start time or an end time of a paging occasion, or a start time or an end time of a paging PDCCH monitoring occasion corresponding to a paging occasion.

2. The method according to claim 1, wherein the paging indication PDCCH monitoring occasion further satisfies any one of the following conditions: before a first time instant, and an offset from the first time instant is a first preset duration; or, after a first time instant, and an offset from the first time instant is a first preset duration, and the first time instant is a start time or an end time of a synchronization signal block, or a channel state information reference signal, or a tracking reference signal.

3. The method according to claim 1, wherein the target bit is a reserved bit in the DCI or the DCI format, or a bit repurposed in an existing field in the DCI or the DCI format.

4. The method according to claim 1, wherein the acquiring the paging indication information comprises:
acquiring the paging indication information from a physical downlink shared channel (PDSCH) scheduled by the paging indication PDCCH.

5. A communication apparatus applied to user equipment, comprising:
a processor and a memory;
wherein the memory stores a computer-executable instruction;
the processor performs the computer-executable instruction stored in the memory to:
monitor a paging indication physical downlink control channel (PDCCH);
acquire paging indication information if the paging indication PDCCH is detected; and
determine, according to the paging indication information, whether to monitor a paging PDCCH;
wherein the processor further performs the computer-executable instruction stored in the memory to acquire the paging indication information from a target bit in downlink control information (DCI) or a DCI format corresponding to the paging indication PDCCH;
wherein the paging indication information is a bitmap, and the bitmap at least comprises a bit corresponding to a user equipment subgroup corresponding to the user equipment;
wherein the processor further performs the computer-executable instruction stored in the memory to:
if the bit is 1, determine to monitor the paging PDCCH; or
if the bit is 0, determine not to monitor the paging PDCCH;
wherein the processor further performs the computer-executable instruction stored in the memory to monitor the paging indication PDCCH, on a paging indication PDCCH monitoring occasion;
wherein the paging indication PDCCH monitoring occasion satisfies: before a second time instant and an offset from the second time instant is a second preset duration; the second time instant is a start time or an end time of a paging occasion, or a start time or an end time of a paging PDCCH monitoring occasion corresponding to a paging occasion.

6. The communication apparatus according to claim 5, wherein the paging indication PDCCH monitoring occasion further satisfies any one of the following conditions: before a first time instant, and an offset from the first time instant is a first preset duration; or, after a first time instant, and an offset from the first time instant is a first preset duration, and the first time instant is a start time or an end time of a synchronization signal block, or a channel state information reference signal, or a tracking reference signal.

7. The communication apparatus according to claim 5, wherein the target bit is a reserved bit in the DCI or the DCI format, or a bit repurposed in an existing field in the DCI or the DCI format.

8. The communication apparatus according to claim 5, wherein the processor further performs the computer-executable instruction stored in the memory to:
acquire the paging indication information from a physical downlink shared channel (PDSCH) scheduled by the paging indication PDCCH.

9. A non-transitory computer-readable storage medium having a computer-executable instruction stored therein, wherein a processor performs the computer-executable instruction to:
monitor a paging indication physical downlink control channel (PDCCH);
acquire paging indication information if the paging indication PDCCH is detected; and
determine, according to the paging indication information, whether to monitor a paging PDCCH;
wherein the processor further performs the computer-executable instruction to acquire the paging indication information from a target bit in downlink control information (DCI) or a DCI format corresponding to the paging indication PDCCH;
wherein the paging indication information is a bitmap, and the bitmap at least comprises a bit corresponding to a user equipment subgroup corresponding to the user equipment;
wherein the processor further performs the computer-executable instruction to:
if the bit is 1, determine to monitor the paging PDCCH; or
if the bit is 0, determine not to monitor the paging PDCCH;
wherein the processor further performs the computer-executable instruction to monitor the paging indication PDCCH, on a paging indication PDCCH monitoring occasion;
wherein the paging indication PDCCH monitoring occasion satisfies: before a second time instant and an offset from the second time instant is a second preset duration; the second time instant is a start time or an end time of a paging occasion, or a start time or an end time of a paging PDCCH monitoring occasion corresponding to a paging occasion.

* * * * *